United States Patent
Hyson (10) Patent No.: US 9,869,341 B2
(45) Date of Patent: Jan. 16, 2018

(54) INTERNALLY GROOVED COMPONENTS

(71) Applicant: CROMPTON TECHNOLOGY GROUP LIMITED, Banbury (GB)

(72) Inventor: Graeme Hyson, Milton Keynes (GB)

(73) Assignee: CROMPTON TECHNOLOGY GROUP LIMITED, Oxfordshire (GB)

( * ) Notice: Subject to any disclaimer, the term of this patent is extended or adjusted under 35 U.S.C. 154(b) by 284 days.

(21) Appl. No.: 14/401,212

(22) PCT Filed: May 15, 2013

(86) PCT No.: PCT/GB2013/051251
§ 371 (c)(1),
(2) Date: Nov. 14, 2014

(87) PCT Pub. No.: WO2013/171486
PCT Pub. Date: Nov. 21, 2013

(65) Prior Publication Data
US 2015/0167730 A1 Jun. 18, 2015

(30) Foreign Application Priority Data

May 15, 2012 (GB) .................................. 1208533.8
Oct. 19, 2012 (GB) .................................. 1218824.9

(51) Int. Cl.
*B29C 65/00* (2006.01)
*B32B 37/00* (2006.01)
(Continued)

(52) U.S. Cl.
CPC ............ *F16C 3/00* (2013.01); *B29C 66/5221* (2013.01); *B29C 66/721* (2013.01);
(Continued)

(58) Field of Classification Search
CPC .. F16C 3/02; F16C 3/023; F16C 3/026; F16C 3/03; B29L 2031/75; B29L 2023/22;
(Continued)

(56) References Cited

U.S. PATENT DOCUMENTS 4,050,722 A * 9/1977 Berger .................. B29C 65/561
285/148.19
4,051,696 A * 10/1977 Mason .................. E21B 17/046
464/16

(Continued)

FOREIGN PATENT DOCUMENTS

EP 2020329 A1 2/2009
EP 1978231 B1 2/2012
(Continued)

OTHER PUBLICATIONS

Notification of Transmittal of the International Search Report of the International Searching Authority, or the Declaration; PCT/GB2013/051251; Oct. 16, 2013, 2 Pages.

*Primary Examiner* — Philip Tucker
*Assistant Examiner* — Brian R Slawski
(74) *Attorney, Agent, or Firm* — Cantor Colburn LLP (57) ABSTRACT

A method is disclosed of manufacture of a component (9) with an internal groove (2,3) comprising: providing a tubular first part (1) with an external groove, bonding or forming a second part (8) on the first part to at least partly cover the external groove, and removing material from the first part to open the external groove to an interior cavity of the component.

13 Claims, 6 Drawing Sheets

(51) Int. Cl.
    *B32B 38/10*     (2006.01)
    *B29C 53/82*     (2006.01)
    *B29C 70/86*     (2006.01)
    *B65H 81/00*     (2006.01)
    *F16C 3/00*     (2006.01)
    *B29C 70/08*     (2006.01)
    *F16C 3/03*     (2006.01)
    *B29L 31/00*     (2006.01)
    *B29L 23/00*     (2006.01)
    *B29K 105/06*     (2006.01)
    *B29K 105/00*     (2006.01)
    *B29L 9/00*     (2006.01)

(52) U.S. Cl.
    CPC .......... B29C 66/742 (2013.01); B29C 70/088 (2013.01); B29C 70/86 (2013.01); F16C 3/03 (2013.01); *B29C 2793/009* (2013.01); *B29C 2793/0036* (2013.01); *B29K 2105/06* (2013.01); *B29K 2105/258* (2013.01); *B29L 2009/00* (2013.01); *B29L 2023/22* (2013.01); *B29L 2031/75* (2013.01)

(58) Field of Classification Search
    CPC ..... B29C 65/48; B29C 65/483; B29C 65/565; B29C 65/76; B29C 66/721; B29C 66/7212; B29C 66/742; B29C 66/7422; B29C 66/74283; B29C 66/5221; B29C 70/088; B29C 70/86; F16D 3/06; F16D 2001/103

USPC ......... 156/60, 153, 154, 155, 166, 169, 172, 156/173, 242, 244.11, 244.13, 244.15, 156/247, 289, 292, 293, 294, 296, 297, 156/298; 464/179, 181, 182, 183, 903

See application file for complete search history.

(56) References Cited

U.S. PATENT DOCUMENTS

| | | |
|---|---|---|
| 4,568,312 A * | 2/1986 | Geisthoff ................ F16D 1/101 464/162 |
| 6,336,986 B1 | 1/2002 | Lee et al. |
| 2003/0114231 A1 | 6/2003 | Bradley et al. |
| 2009/0016893 A1* | 1/2009 | Lee ....................... F04C 2/1075 416/241 R |
| 2010/0007136 A1* | 1/2010 | Subbaraman ........... B29C 65/56 285/66 |

FOREIGN PATENT DOCUMENTS

| | | |
|---|---|---|
| JP | S59194132 A | 11/1984 |
| JP | 2000152732 A | 6/2000 |

* cited by examiner

INTERNALLY GROOVED COMPONENTS

This invention relates to an internally grooved component, and to a method of manufacture thereof. The invention is particularly applicable to internally grooved components of composite form.

Components with internal grooves are useful in a number of applications. One application is in coupling two components together to transfer torque therebetween. A first component may comprise a protruding feature such as a key and the second component may comprise a groove within which the protruding feature is received. The protruding feature may be located on an exterior surface of the first component and the groove may be on an interior surface of the second component. Alternatively, a male and female spline arrangement may be used in which a plurality of protruding external features of a first component are received in a plurality of internal grooves in a second component.

In some applications, a first component must be able to move axially within a second component while the first and second components are rotationally coupled so as to transmit torque. An example of such an application is a telescopic drive coupling. A telescopic drive coupling may comprise a tube having an axial internal groove, within which a shaft having an axial key is slidingly disposed. The key and groove co-operate to transmit rotation and torque, while accommodating axial movement between the ends of the coupling.

One application for such a coupling is described in EP1978231, in which a telescopic drive coupling is used to transmit rotary drive from a motor and associated transmission arrangement to an actuator with a rotatable drive input. The actuator is mounted upon a movable component, and so the distance between the actuator and the transmission arrangement is variable, in use. The coupling must be able to accommodate this. Such an arrangement may be used to drive a Variable Area Fan Nozzle (VAFN) cowl.

In some applications, a relatively long component with an internal groove is required. The VAFN application of EP1978231 for instance requires an internally grooved tube with a length of over 0.5 m.

It is preferable that the walls of the internal grooves of the tube are formed from a hardwearing material, and that the total weight of the tube is kept to a minimum. An internally grooved tube entirely consisting of metal would be too heavy for many applications.

Furthermore, machining or otherwise forming the internal grooves in a relatively long narrow tube is challenging, especially where the tube has thin walls. It is difficult and expensive to machine axial internal grooves within a tube, and particularly so when the tube has a relatively small internal diameter and is relatively long. Removing material using existing manufacturing methods to produce internal grooves tends to cause large deformation of the tube walls. This deformation results in either grooves which are not sufficiently straight, grooves with unacceptable varying width, tubes with unacceptable ovality or any combination of these effects.

In a first aspect the present invention provides a method of manufacture of a component with an internal groove comprising: providing a first part with an external groove, bonding or forming a second part on the first part to at least partly cover the external groove, and removing material from the first part to open the external groove to an interior cavity of the component.

The method may conveniently further comprises the step of forming the external groove on the first part.

Preferably the method further comprises substantially filling the external groove on a first part with a filler, and removing the filler from the groove. The step of removing the filler from the groove may be after the step of removing material from the first part to open the external groove to an interior cavity of the component.

Conveniently the groove and filler may be coated with a release agent to prevent the second part from sticking to the filler.

The filler may comprise the same material as the first part.

In a preferred embodiment the filler is removed by dissolving or melting. When filler is removed by dissolving or melting preferably the filler is removed prior to removing material from the first part to open the groove to the interior cavity.

Alternatively to the method of substantially filling the external groove with a filler, the method may involve forming a pair of external grooves on the first part, the external grooves defining a key portion therebetween, and wherein the step of removing material from the first part opens both of the external grooves to the interior cavity of the component, thereby freeing the key portion. The method may further involve a step of removing the key portion to form the internal groove. It will be appreciated that the key portion mentioned herein serves substantially the same function as the filler described above.

Each of the pair of external grooves used to define the key portion is preferably narrow relative to the width of the key portion. By way of example, each external groove may have a width that is one fifth or less of the width of the key portion.

By defining and forming the internal groove using a pair of narrow external grooves, a wide range of profiles for the internal groove can be formed. Furthermore, the profile of the internal groove can easily be varied along the length of the component simply by changing the spacing and/or orientation of the narrow external grooves. For example, if the external grooves diverge along the length of the component, or part thereof, the internal groove formed using the method will be of tapering width. Using a pair of narrow external grooves thus allows a broad range of internal groove profiles to be accommodated. This is because this method does not require that the external groove be of substantially the desired profile of the internal groove Further, with this alternative method, it is no longer necessary to provide an accurately machined filler part or key that corresponds with the shape of the internal groove. Manufacturing and inserting a key with a complex profile such a helix would be difficult. In contrast, when the key portion is defined by a pair of grooves, it is more straightforward to create complex non-linear internal slot profiles.

Surface treatments such as passivation and plating can be applied more easily to the component compared to the above filler method, since the risk of damage due to the insertion of a key portion has been eliminated. Furthermore, the cost associated with precision manufacturing of keys for insertion into a full width slot have been removed, thereby reducing the total cost of manufacturing of the component.

Conveniently the key portion and pair of grooves may be coated with a release agent to ease removal of the key portion.

The first part may be formed by bonding or forming a composite element onto a tubular component.

The method may comprise the step of filing the external grooves with a shim material.

Removing material from the first part may enlarge or form the interior cavity of the component, and may split the first part into a plurality of elements.

The walls of the groove may be defined by adjacent radial protrusions.

The second part preferably comprises a fibre reinforced composite which may be formed by filament winding over the outer surface of the first part, and curing the fibre reinforced composite in situ on the first part.

The first part may comprise any suitable material. For example, it may comprise aluminium, titanium, stainless steel, and/or a composite material, for example of the carbon or glass fibre reinforced polyester type. In a preferred embodiment, the first part may comprise a metallic tube upon part of which a composite material is provided. Such an arrangement may have weight benefits.

The method may provide a tubular component with internal grooves. As the component may be of composite form, it may be of relatively low weight and have good strength properties. The method allows the grooves to be formed with a high degree of accuracy.

The invention further relates to a tube with an internal groove, comprising a tubular composite outer part and at least one metal part bonded to the composite outer part and extending into the tube, wherein an internal groove is defined within the tube by both the composite outer part and the at least one metal part. Such a tube may be manufactured using the method set out hereinbefore.

Preferably the internal groove has two substantially side walls which are defined by the at least one metal part, and a further base wall defined by the composite outer tube. In a preferred embodiment the internal groove extends axially. Further, the composite outer tube may comprise a fibre reinforced matrix.

Preferably a plurality of internal grooves are defined by both the composite outer part and the at least one metal part.

In another aspect, there is provided a method of manufacture of a component with an internal groove comprising: substantially filling an external groove on a first part with a filler, bonding or forming a second part on the first part to at least partly cover the filled external groove, removing material from the first part to open the filled groove to an interior cavity of the component, and removing the filler from the groove.

In yet another aspect, there is provided a method of manufacture of a component with an internal groove, the method comprising forming at least one external groove on a first part, bonding or forming a second part onto the first part to at least partly cover the external groove, and removing material from the first part to open the external groove to an interior cavity of the component.

The invention will further be described, by way of example, with reference to the following drawings in which.

Figure 1:
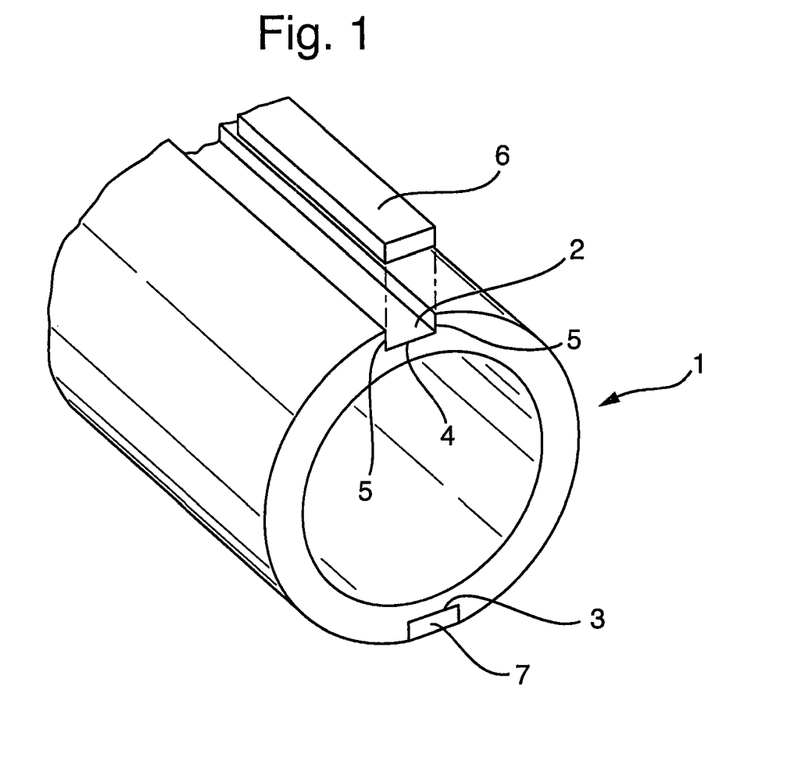
FIG. 1 is a schematic view of a first part according to a first embodiment of the invention, with two external grooves, with a filler for each groove.

Referring to FIG. 1, a tubular first part 1 is shown, having two diametrically opposite external axial grooves 2, 3. Each groove 2, 3 has a flat base wall 4 which is tangential to the circumference of the first part 1 at the centre of the groove, and two side walls 5 which are substantially perpendicular to the base wall 4. Each external groove 2, 3 has a depth at least as deep as the required depth of the intended internal grooves.

Accommodated within each groove 2, 3 is a filler 6, 7, arranged to conform with the shape of the groove so that each filler substantially fills its respective groove when it is inserted into it. When both fillers 6, 7 are inserted in their respective grooves 2, 3, the external profile of the combined first part 1 and fillers 6, 7 is substantially cylindrical. In FIG. 1, one of the fillers 6 is shown out of its respective groove 2 for clarity.

The tubular first part 1 comprises metal, for example stainless steel, aluminium or titanium. The external grooves 2, 3 may be formed by any suitable process, for example by machining. The fillers 6, 7 may comprise the same material as the first component, and may be preformed to the desired shape and size. Prior to insertion of the fillers 6, 7, the grooves 2, 3 and fillers may be coated with release agent to aid their subsequent removal. Alternatively, a wax or other similar material may be used as the filler material, being poured, in a liquid state, into the grooves and allowed to set therein to form the fillers 6, 7.

Figure 2:
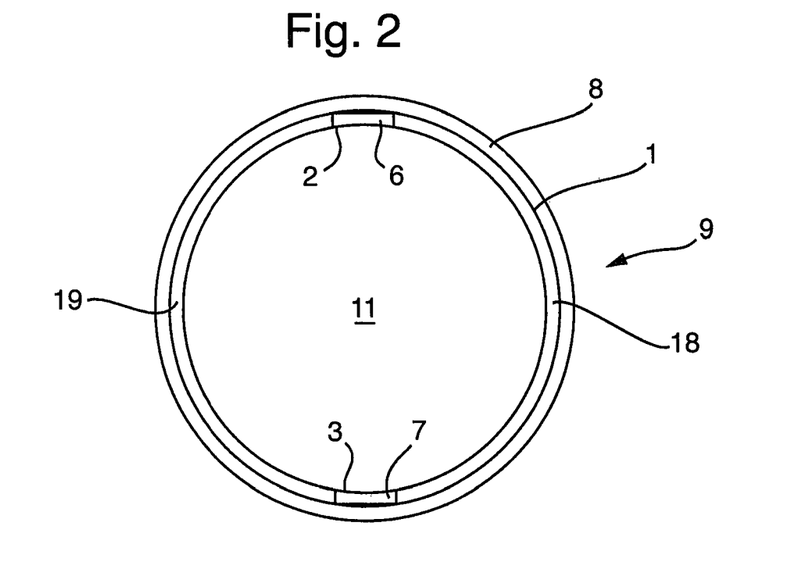
FIG. 2 is a sectional view of a first part bonded to a second part according to the first embodiment of the invention.

A second part 8 is subsequently bonded or formed on the tubular first part 1, covering the filled grooves 2, 3, to produce a component 9 comprising the first part and the second part. Referring to FIG. 2, a tubular second part 8 is shown bonded onto the external cylindrical face of the first part 1. The filled grooves 2, 3 are thereby encapsulated by the first and second part 1, 8, the second part 8 defining a further base wall 10 of the grooves 2, 3 that is radially outwards of the base wall 4 defined by the first part 1. A release agent coating the fillers 6, 7 may inhibit the second part 8 from bonding to them.

The second part 8 may be bonded or formed on the first part 1 by any suitable process. For example, the second part 8 may comprise a composite that is filament wound onto the first part 1, and subsequently resin impregnated. Alternatively, a second part 8 that is already formed may be bonded to the first part 1.

Having bonded or formed the second part 8 on the first part 1, as shown in FIG. 2, material is subsequently removed from the interior of the first part 1, for example by machining or using another suitable technique, to open the grooves 2, 3 by removing the base wall 4. The grooves 2, 3 are thereby opened to an interior cavity 11 of the component 9, which in this example embodiment is the interior 11 of the tube. Furthermore, the first part 1 is thereby split into two separate elements 18, 19.

Figure 3:
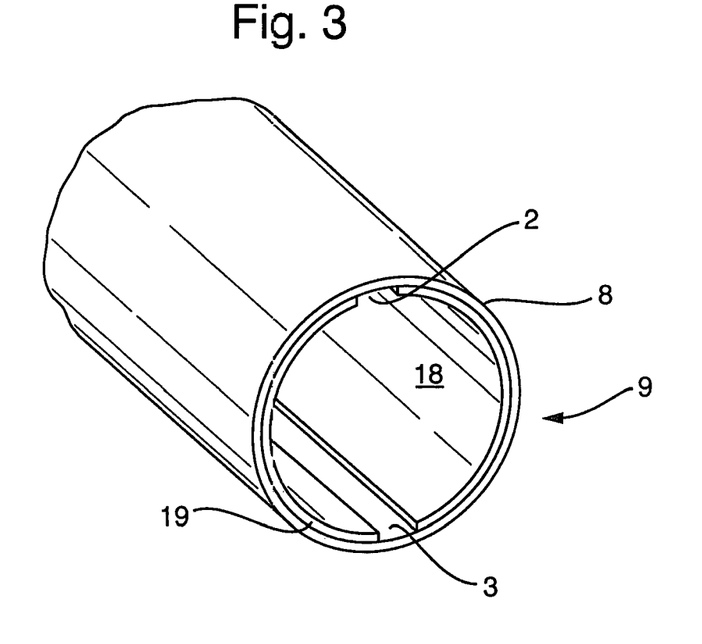
FIG. 3 is a schematic view of a component according to the first embodiment of the invention comprising a first and second part, and with an internal groove.

The fillers 6, 7 are then removed from the grooves 2, 3, through the inward facing openings thereof. A component 9 is thereby formed with internal grooves 2, 3, as shown in FIG. 3.

A component according to an embodiment of the invention formed in this manner thus combines a composite part with light weight and high strength with a machinable and hardwearing metal part that accurately defines an internal bearing surface or keyway. The method according to an embodiment of the invention makes this component feasible by facilitating its manufacture.

Although an example embodiment has been described in which a metal first component is combined with a composite second component, the first component may comprise any suitable material. A key factor in selecting the first component is the machinability of the material, since the first component must be suitable for machining an accurate external groove. A polymer or composite material may therefore be used for the first component. It may be advantageous for the filler to be of the same material as the first component to aid the machining process, as the juddering or tool tip damage or blunting which may arise as the tool tip passes the interfaces between different materials may be avoided or lessened.

Any number of grooves may be included according to an embodiment of the invention depending of the required application.

An embodiment has been described in which the groove is axial (and therefore linear), but alternative arrangements are envisaged including a non-linear groove, for instance a helical groove. Such an arrangement may be used in a number of applications, for example as an internal screw thread. Alternatively, the grooves may be formed axially but interconnected by circumferentially, or part-circumferentially extending regions located at or adjacent each end of the axially extending parts of the grooves to form closed or semi-closed loops.

Each filler may comprise any material that can be removed after the base wall of the first component is removed. For instance, a filler may comprise a material that can be melted or dissolved from the groove after material is removed from the first part to open the groove. Such a filler may be moulded or poured into the external groove of the first component before being allowed to set. Removing a filler in the liquid phase may enable more complex groove patterns to be realised, including non-linear grooves, and grooves in which part of the base wall of the first part is intact in the final component. Fillers comprising a resiliency elastic material that is conformed to the shape of the groove on insertion are also envisaged, and may be particularly suitable for complex grooves.

A component according to an embodiment of the invention may be of a size and shape that is prohibitive for prior art methods of production, for instance being a long thin walled tube with a relatively small internal diameter. A component according to an embodiment may for instance be in excess of 0.5 m long, and have an internal diameter of less than 40 mm.

In the example embodiment, the first and second parts are tubular. In alternative embodiments the first and/or second part may be a different shape.

The first part need not be tubular or include a cavity before material is removed to open the filled groove. A cavity may instead be formed in the component at the same time that material is removed from the first part to open the filled groove. For instance, the first part may be a solid bar, in which an internal axial hole is formed to both open the groove and form a cavity.

Figure 4:
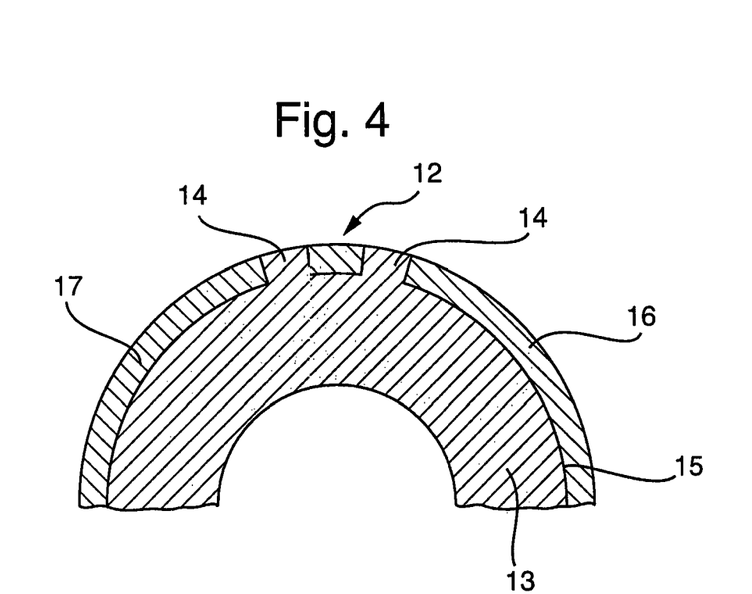
FIG. 4 is a schematic of a first part according to a second embodiment of the invention.

In a further alternative depicted in FIG. 4, instead of being defined by a recess in a substantially cylindrical external profile of the first part, a groove 12 of a first part 13 may instead be defined by adjacent radial protrusions 14 that extend from the substantially cylindrical external profile 15. Such an arrangement may be produced by removing material from a tube in all areas that are not immediately adjacent to the side walls of the groove 12. When the first part 13 is combined with a second part 8 as described herein, most of the material of the first part 13 can be conveniently removed when the filled groove 12 is opened. For instance, if the internal diameter of the component is increased to remove the base wall 4 defined by the first part 13, only the radial protrusions 14 that define the groove 12 will be left. Such an arrangement may be advantageous, for example resulting in a component with reduced mass, particularly where the first part is metal and the second part is a composite material.

Depending on the application, it may be useful to fill external regions of the first part that will not subsequently form internal grooves. FIG. 4 depicts an additional pair of removable fillers 16, 17 that produce a circular external profile onto which the second part may be formed or bonded. It may be more convenient to bond or form the second part onto a circular external profile.

The method disclosed herein avoids the need for internal machining to produce grooves internal to a component. Using the method, a groove can first be defined with a high degree of accuracy in the first part with the sidewalls of the groove being fixed in the appropriate conformation by the base wall of the first part. Having bonded or formed a second part on the first part, the sidewalls of the groove are fixed in the appropriate conformation by the second part, and the base wall of the first part may be removed while maintaining the accurate shape of the groove.

Figure 5A:
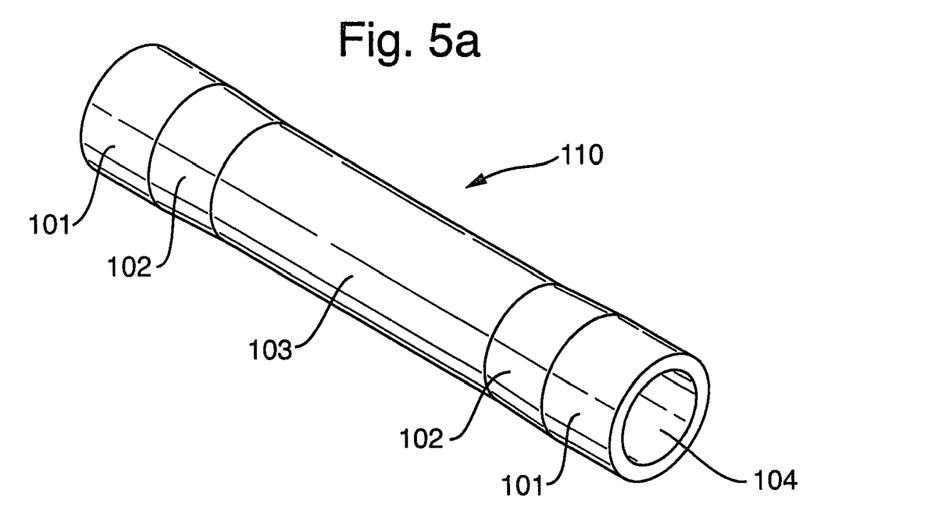
FIGS. 5a and 5b are schematic perspective and sectional views of a metal tube for use in a method according to a third embodiment of the invention.
Figure 5B:
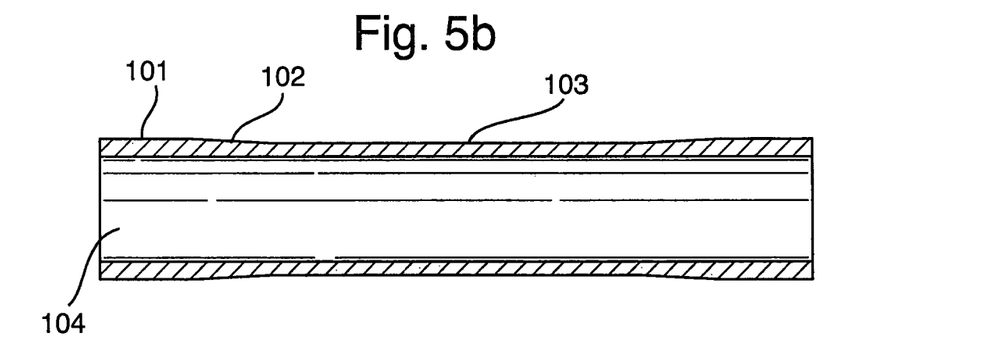

In another embodiment, referring to FIGS. 5a and 5b, a tubular component 110 is shown, having an axial through bore or passage 104, and regions 101 having a cylindrical outer surface at and adjacent each end thereof. Adjacent to each cylindrical region 101 is an inwardly tapering region 102 leading to a central cylindrical region 103 of reduced diameter compared to the regions 101. The end regions 101 of the tubular component 110 therefore have an increased wall thickness relative to that of the central region 103. The tubular component 110 is conveniently made of a metallic material, for example aluminium, titanium or steel.

Figure 6A:
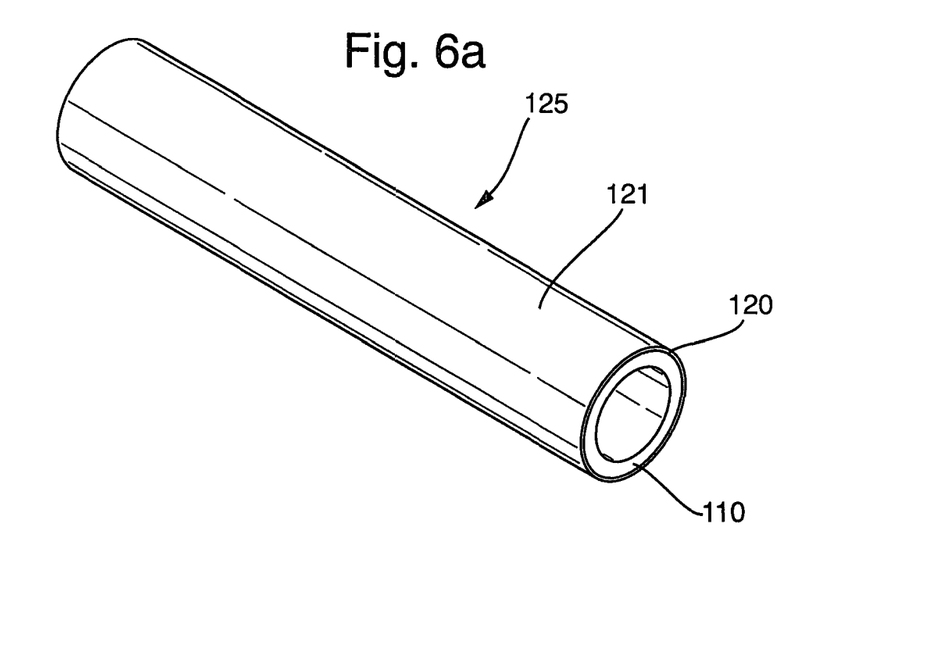
FIGS. 6a and 6b are schematic perspective and sectional views of a composite portion bonded to the metal tube to form a first part for use in the method according to the third embodiment of the invention.
Figure 6B:
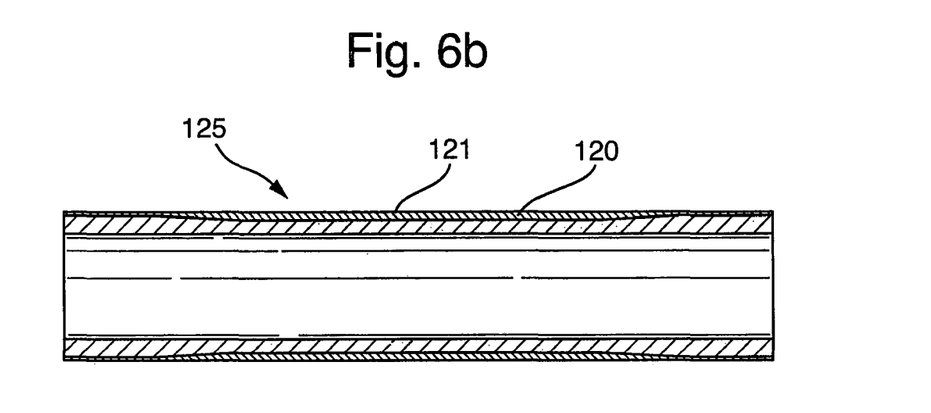

A composite element 120 is formed on or bonded onto the tubular component 110, thereby forming a first part 125, as shown in FIGS. 6a and 6b. The composite element 120 has a substantially cylindrical outer profile 121, and is therefore thinner at the ends thereof, where it overlies the end regions 101 of the tubular component 110, than it is in the central portion thereof which overlies the central region 103 of the tubular component. In some embodiments, it may not be necessary to extend the composite element 120 fully to the ends of the tubular component 110, with the composite element 120 filling only the reduced diameter region of the tubular component 110. The composite element 120 may be bonded or formed on the tubular component 110 by any suitable process. For example, composite element 120 may comprise a resin impregnated composite that is filament wound onto the tubular component 110, and subsequently cured. Alternatively, a composite element 120 that is already formed may be bonded to the tubular component 110.

Figure 7:
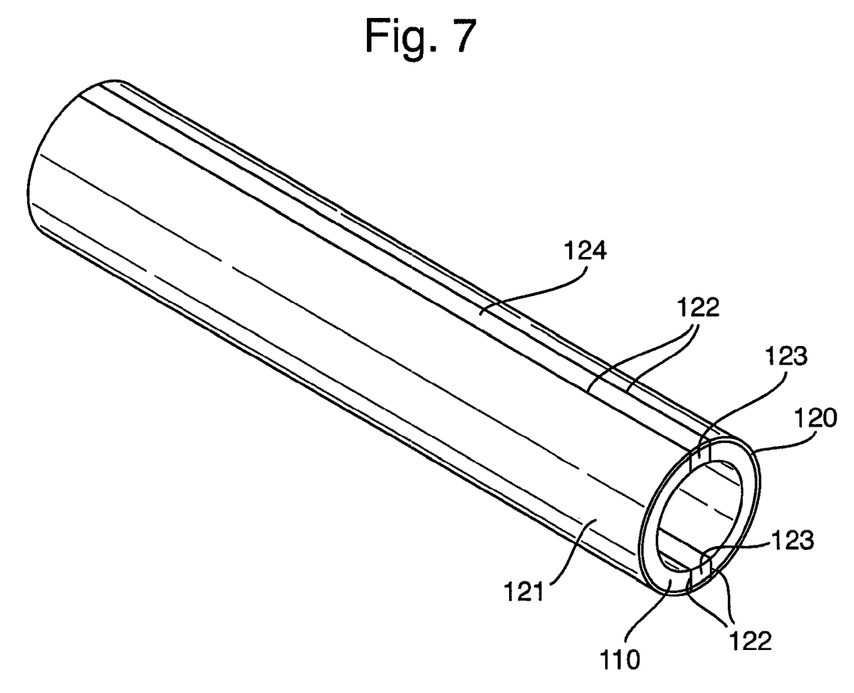
FIG. 7 is a schematic perspective view of the first part at an intermediate stage of the method according to the third embodiment of the invention.

As shown in FIG. 7, after formation of the first part 125, two pairs of narrow external grooves 122 are machined into the outer surface of the first part 125. The external grooves 122 extend through the composite element 120 of the first part 125, and into the tubular component 110, but do not break through the internal face of the through passage 104 thereof. Each pair of grooves 122 defines a key portion 123 therebetween. In the present embodiment, two diametrically opposed identical key portions 123 are defined by the external grooves 122. The narrow external grooves 122 may be formed by any suitable process, for example by machining such as sawing, milling, or electro-discharge machining.

In this embodiment, each of the narrow grooves 122 is substantially axial, and the grooves 122 are parallel in both the longitudinal and lateral directions. In other embodiments there may be a different number of pairs of grooves, and the individual grooves of each pair may be non-parallel in either longitudinal and/or lateral directions. In some embodiments the key portion 123 defined by each pair of grooves 122 may be helical, and/or taper in the longitudinal or lateral directions, or may be of other shapes.

The external grooves 122 may, if desired, be filled with a shim material or similar.

After formation of the external grooves 122, a second fibre reinforced composite part 130 is formed on the first part 125. Once the second part 130 has been cured, the diameter of the internal passage 104 of the tubular component 110 is enlarged by appropriate machining thereof. The diameter of the passage 104 is enlarged to such an extent that the external grooves 122 breakthrough and open into the passage 104. Next, the key portions 123 are removed resulting in the formation of a tubular component 1001 with internal grooves 126 formed therein. The internal grooves 126 have sidewalls 126a defined by the first part 125, and a base wall 127 defined by the second part 130. The portions of the first part 125 defining the sidewalls 126a comprise both part of the composite element 120 and tubular component 110.

Figure 8A:
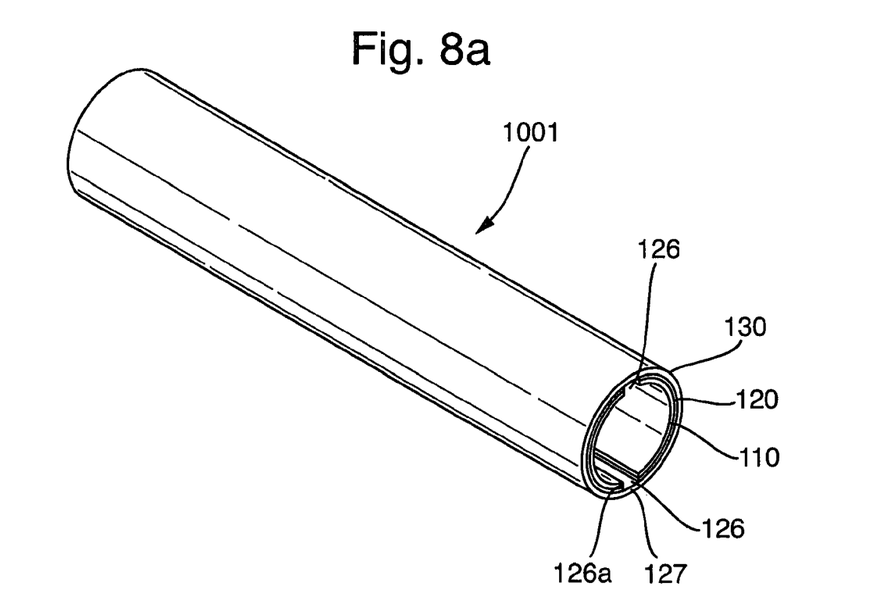
FIGS. 8a and 8b are schematic perspective and sectional view of an internally grooved component comprising a first and second part manufactured according to the method according to the third embodiment of the invention.
Figure 8B:
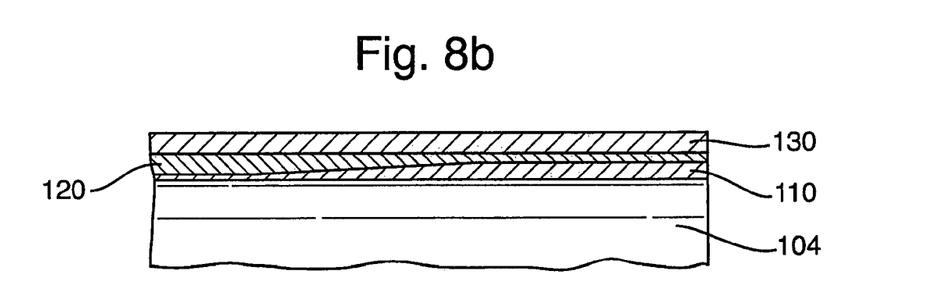

FIGS. 8a and 8b show the final product of this embodiment. FIG. 8b is a cross section of a portion of one half (in the radial direction) of the tubular component. FIG. 8b shows the second part 130 covering the outer surface of the first component 125. As described above, the first component 125 in this embodiment is formed from the tapered tubular component 110 and the composite element 120.

The tubular component 110 has an axial through bore or passage 104, regions 101 having a cylindrical outer surface each end thereof which have a greater outer diameter than the central cylindrical region 103. The larger cylindrical region 101 is connected to the smaller central cylindrical region 103 by the tapering region 102. The diameter of the through bore 104 is constant and thus the end regions 101 of the tubular component have an increased wall thickness relative to that of the central region 103.

The component formed according to this embodiment of the invention combines a composite part 120 that is light weight and high strength with a machinable and hardwearing metal part 110 that accurately defines an internal bearing surface or keyway. Further the first part 125 is tailored to have increased strength and durability at the end portions where the component may be subjected to greater forces. This embodiment provides a component which can provide the desired strength and durability without the component being too heavy.

It will be appreciated that the key portion mentioned hereinbefore serves substantially the same function as the filler described in the above alternative embodiment (in association with FIGS. 1 to 4).

The external face of the key portion 123 and the internal surfaces of the grooves 122 and shims (if fitted) are preferably coated with a suitable release agent prior to the formation of the second part 130 so as to resist or reduce the risk of the second part 130 bonding or adhering to it, and thereby assisting in the removal of the key portion 123.

The method described hereinbefore is advantageous in that it makes it more straightforward to manufacture a component with an internal groove, and improves the ease with which internal grooves with a complex geometry may be created. A component formed using the method combines a composite part with light weight and high strength with a hardwearing metal part that accurately defines an internal bearing surface or keyway.

Although an example embodiment has been described in which a first part 125 comprising metal and composite is combined with a composite second part, the first component may comprise any suitable material, for example it may be of metallic form alone. A key factor in selecting the material and form of the first part 110 is the machinability of the material, since the first part 110 must be suitable for machining or otherwise treating to form an accurate external groove therein. Additionally, the first part 125 made of the tubular component 110 and the composite element 120 may also be used with the above described embodiment in which a filler 6, 7 is inserted into the groove.

Any number of external grooves may be included according to an embodiment of the invention depending of the required application.

An embodiment has been described in which the internal groove is axial (and therefore linear), but alternative arrangements are envisaged including a non-linear internal groove, for instance a helical groove, provided removal of the key portion is possible. Such an arrangement may be used in a number of applications, for example as an internal screw thread. Alternatively, the grooves may be formed axially but interconnected by circumferentially, or part-circumferentially extending regions located at or adjacent each end of the axially extending parts of the grooves to form closed or semi-closed loops. Furthermore, by appropriate orientation of the external grooves, internal grooves of complex profiles, for example of different width at their inner periphery to that at their outer periphery, are possible.

In the example embodiments, the first and second parts are tubular. In alternative embodiments the first and/or second part may be a different shape.

The first part need not be tubular or include a cavity before material is removed to open the narrow grooves and detach the key portion. A cavity may instead be formed in the component at the same time that material is removed from the first part to open the grooves. For instance, the first part may be a solid bar, in which an internal axial hole is formed to both open the grooves and form a cavity.

Whilst specific embodiments of the invention have been described hereinbefore, it will be appreciated that a number of modifications and alterations may be made thereto without departing from the scope of the invention.

The invention claimed is:

1. A method of manufacture of a component with an internal groove comprising:
    providing a first part with an external groove, bonding or forming a second part on the first part to at least partly cover the external groove, and removing material from the first part to open the external groove to an interior cavity of the component.

2. The method of claim 1, further comprising substantially filling the external groove on a first part with a filler, and removing the filler from the groove.

3. The method of claim 2, wherein filling the groove with a filler comprises first coating the groove and filler with a release agent.

4. The method of claim 2, wherein the filler comprises the same material as the first part.

5. The method of claim 2, wherein the filler is removed by dissolving or melting.

6. The method of claim 5, wherein the filler is removed prior to removing material from the first part to open the groove to the interior cavity.

7. The method of claim 1, the method comprising forming a pair of external grooves on the first part, the external grooves defining a key portion therebetween, and wherein the step of removing material from the first part opens both of the external grooves to the interior cavity of the component, thereby freeing the key portion.

8. The method of claim 7, wherein the method comprises filling the external grooves with a shim material.

9. The method of claim 1, wherein the method comprises forming the first part by forming or bonding a composite element onto a tubular component.

10. The method of claim 1, wherein removing material from the first part enlarges or forms the interior cavity of the component.

11. The method of claim 1, wherein removing material from the first part splits the first part into a plurality of elements.

12. The method of claim 1, wherein the walls of the groove are defined by adjacent radial protrusions.

13. The method of claim 1, wherein the second part comprises a fibre reinforced composite.

* * * * *